United States Patent
Enabnit

[15] 3,665,387
[45] May 23, 1972

[54] SIGNALLING SYSTEM FOR LOW TIRE CONDITION ON A VEHICLE

[72] Inventor: Robert S. Enabnit, Akron, Ohio
[73] Assignee: The Goodyear Tire & Rubber Company, Akron, Ohio
[22] Filed: Aug. 31, 1970
[21] Appl. No.: 68,445

[52] U.S. Cl. ............................340/58, 73/146.5, 180/103, 307/10
[51] Int. Cl. .........................................B60c 23/02
[58] Field of Search ............340/58, 213, 52 H, 52 D, 384 E, 340/52 R; 307/10 R, 118; 200/83 H, 83 K, 83 N, 83 R, 61.25; 180/103; 73/146.5; 331/181, 65; 336/30

[56] References Cited

UNITED STATES PATENTS

| | | | |
|---|---|---|---|
| 3,374,460 | 3/1968 | Massoubre | 340/58 |
| 2,799,843 | 7/1957 | Savino | 340/52 D |
| 2,935,581 | 5/1960 | Dobrikin | 200/83 H |

Primary Examiner—John W. Caldwell
Assistant Examiner—Glen R. Swann, III
Attorney—F. W. Brunner and Oberlin, Maky, Donnelly & Renner

[57] ABSTRACT

A fail-safe low tire pressure warning system adaptable for any number of wheels of a vehicle and providing dashboard indications of system operation and low pressure conditions while the vehicle is in motion. A pair of coils mounted on each wheel are interconnected under normal conditions by a switch responsive to tire pressure and periodically, due to wheel rotation, quench an oscillator circuit by reversing the normal magnetic field occurring in a second pair of coils in the oscillator. Pulses generated as a result of the quenching are accumulated to form a signal for controlling lamp indicator circuits. A low pressure condition or inoperativeness of the circuit is recognized by a red lamp indication or absence of any indication. A minimal warning system for a multiple wheeled vehicle using diode logic is described as are tire pressure switches for truck and passenger car applications.

17 Claims, 6 Drawing Figures

Patented May 23, 1972
3,665,387
2 Sheets-Sheet 1
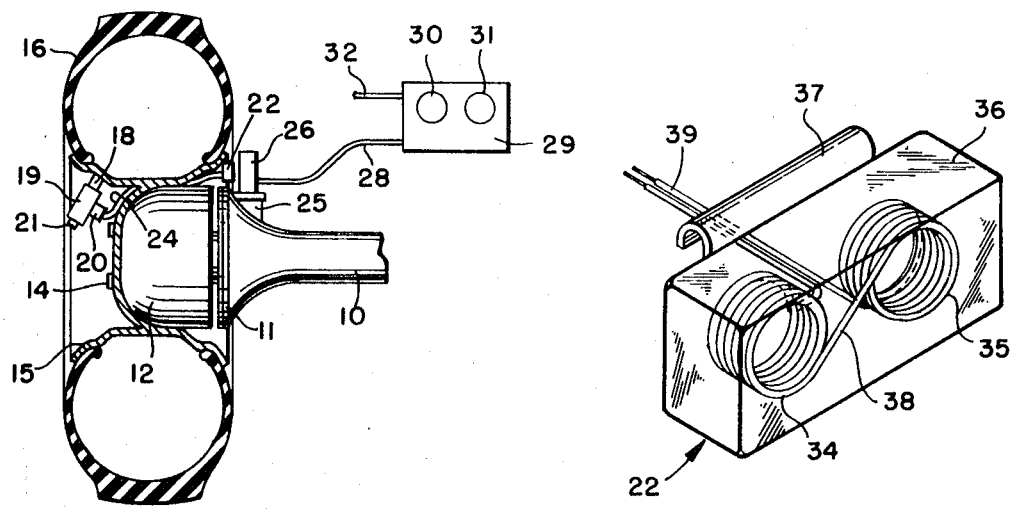
Fig. 1
Fig. 2
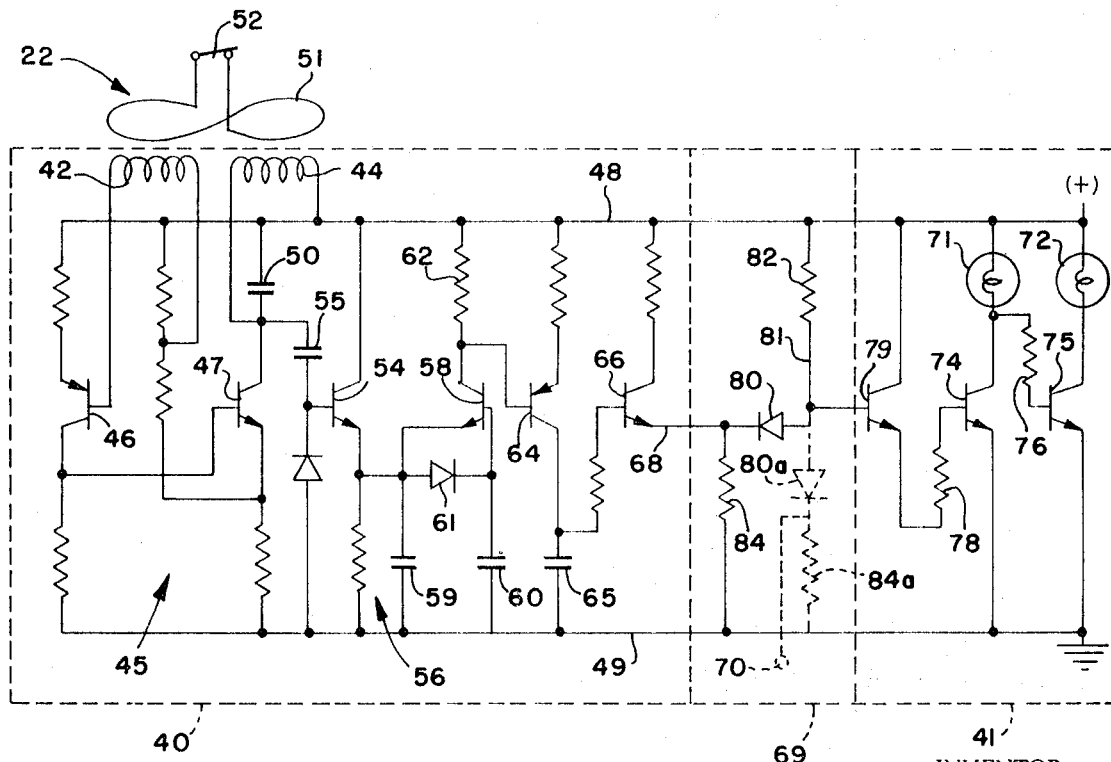
Fig. 3
INVENTOR.
ROBERT S. ENABNIT
BY
Oberlin, Maky, Donnelly & Renner
ATTORNEYS INVENTOR.
ROBERT S. ENABNIT
BY
Oberlin, Maky, Donnelly & Renner
ATTORNEYS

3,665,387

SIGNALLING SYSTEM FOR LOW TIRE CONDITION ON A VEHICLE

BACKGROUND OF THE INVENTION

This invention relates to signalling systems and more particularly to a fail-safe system for indicating low tire pressure conditions while a vehicle is in motion.

Tire pressure warning systems are presently available but have not found widespread acceptance since they are uneconomical or unreliable, requiring periodic checking and maintenance procedures or tuning of the circuits for proper operation.

One problem in systems of this type is that of transmitting monitoring signals between a movable member and the relatively stationary portion of the vehicle and the most practical technique developed to date to achieve this end is the magnetic coupling of signals. This technique obviates the drawbacks of brush wear and contamination in slip ring type systems and the like. Further it eliminates the requirement for supplying power on the movable member and results in a system readily implemented and easily maintained, providing a wide tolerance of operation.

In all other known systems, the apparatus is arranged in a manner that environmental factors affect the signals transmitted in a manner similar to that when a low tire pressure condition is being signalled, resulting in anomalous indications and a lack of confidence in the integrity of the system.

It is therefore desirable to provide a signalling system for low tire pressure conditions which requires no power source or active components on the movable member, which is relatively long lived, which operates in a manner abnormal to the environment and which is sufficiently fail-safe to provide reliable and consistent indications.

SUMMARY OF THE INVENTION

In the instant invention only a pair of coils and a pressure sensitive switch are employed on the movable member to provide an indication of the low tire pressure condition, such apparatus cooperating with a signal source maintained on the relatively stationary portion of the vehicle. The characteristics of the signal source are affected in a unique manner which can be recognized and discriminated from environmental influences or non-measurement conditions. With regard to the latter, for example, the instant invention is capable of detecting not only the low pressure condition of the pressure switch, but also the conditions encountered when the vehicle is stationary and the signalling apparatus is in any position with respect to the detector apparatus.

In the instant invention movement of the vehicle is relied upon to provide a characteristic signal and such signal is only obtained in the presence of a positive signal from the pressure sensor circuit to provide an indication of the proper operating condition of the system, the absence of either signal providing a non-operative indication or that indication for a low pressure condition.

The simplicity of the sensor circuit in requiring only a pair of coils and a pressure switch is carried through in the remainder of the system in that a minimum of discrete active and passive components forming an oscillator and detector circuit, together with only a two lamp and associated amplifier indicator circuit for a single vehicle wheel warning system are required. When indications from more than one wheel are desired, additional sensors and detectors are used and doubling up of some of the components of the indicator circuit is employed. One embodiment of the invention is described as requiring only a trio of indicator lamps for providing individual front wheel indications and combined indications for any number of wheels on a vehicle using diode logic and manual selector switches for determining exact fault locations.

One of the sources of inconsistencies of prior art systems is the tire pressure sensor switch which is required to be operative for long intervals of time without performing a switching function. It is exposed to extremely harsh environmental conditions, and must be relied on to perform the switching function when a particular condition is encountered. In the instant invention, failure of such component is immediately detected, and improved designs of same are employed, assuring longevity and consistency.

Therefore it is one object of this invention to provide an improved tire pressure warning system for vehicles in which a fail-safe indication is provided of normal system operation and of low tire pressure conditions.

It is another object of this invention to provide an improved warning system for vehicle tire pressures in which a signal is generated during vehicle movement indicative of the normal operating conditions and the absence of such signal is recognized as a fault indication.

It is yet another object of this invention to provide an improved tire pressure warning system in which discrimination is provided between non-operativeness of the system and the desired normal pressure indication.

It is a still further object of this invention to provide an improved tire pressure warning system for a multiple wheeled vehicle wherein only a minimal number of visual indicators provide recognition for fault in any one wheel of the vehicle.

It is a still further object of this invention to provide an improved low tire pressure warning system of the fail-safe type which utilizes a unique configuration of sensor coil and pressure switch combination on the movable wheel as the complete sensing mechanism for the system.

It is yet another object of this invention to provide improved tire pressure switches for both truck and passenger car applications.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the drawings:

FIG. 1 is a cross-sectional view of a truck wheel and axle implemented with the apparatus of this invention, including a schematic showing of the indicator unit located in the cab of the truck;

FIG. 2 is a perspective view of the sensor coil unit showing the relationship of the sensor coils therein;

FIG. 3 is a schematic circuit diagram of a preferred embodiment of the invention particularly applicable to passenger vehicles;

DESCRIPTION OF THE PREFERRED EMBODIMENTS

Figure 4:
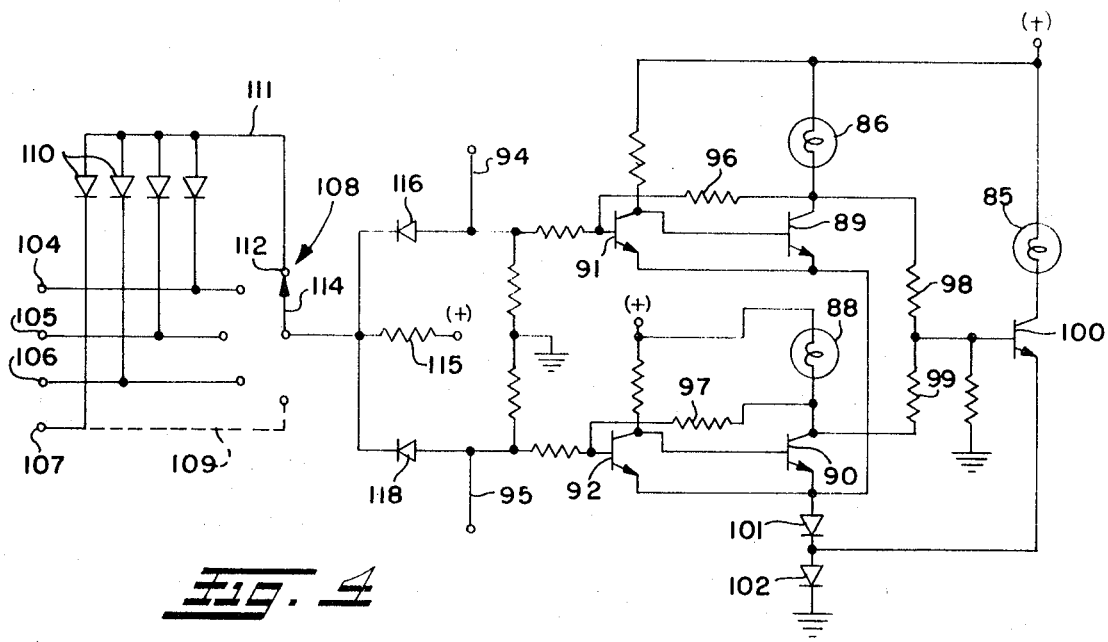
FIG. 4 is a schematic circuit diagram of a second embodiment of the invention particularly applicable to buses, trucks and vehicles having a multiple wheeled system.

Referring now to FIG. 1 there is shown a truck axle 10 culminating in a flange 11 and rotatably supporting a hub 12 in a typical vehicle configuration. The axle 10, although suspended from the remainder of the vehicle, may be considered a portion of the relatively stationary part of the vehicle with respect to the rotary movement occurring in the hub 12 during vehicle movement. Affixed to the hub 12 by lug bolts 14 is the wheel 15 supporting a tire 16 thereon, communication being attained with the interior of the tire 16 by a valve stem 18 protruding through the rim section of the wheel 15.

Threadedly mounted on the valve stem 18 is a tire valve "T" extension 19 which receives the pressure switch 20 for monitoring air pressure within the tire 16 and through which air for inflation may be transmitted to the interior of the tire, by a conventional valve 21. Although specific embodiments of the pressure switch 20 will be described in greater detail hereinafter, for purposes of description of the system operation, such pressure switch 20 may be considered as continuously sensitive to the air pressure in the tire 16 and in a normally closed condition under normal or higher tire pressures. The switch 20 is adapted to change to an open circuit condition upon sensing a predetermined pressure level, lower than the normal tire pressure level.

Also mounted on the rim of the wheel 15, for rotation therewith, is the sensor coil unit 22 which rotates, or moves in a path of travel, in a plane parallel to the plane of rotation of the wheel 15 and which is connected with the pressure switch 20 by means of wires 24 passing through suitable apertures in the wheel 15.

The pressure switch 20 and sensor coil unit 22 act in combination to provide the necessary indications of tire pressures and it is significant to note that no other devices are required on the movable portion of the vehicle. Various arrangements of switch 20 and sensor coil unit 22 may be employed as will be described in greater detail, and it is only necessary that proximity to the relatively stationary portion of the vehicle be attained and that a desired magnetic influence be provided under prescribed conditions.

Mounted adjacent the flange 11 of the axle 10, on a suitable bracket 25 fastened thereto, is the detector unit 26, the latter being positioned adjacent the path of travel of the sensor coil unit 22 and spaced a short distance therefrom so as to allow magnetic coupling. The detector unit 26 in turn is connected by way of conductive wires 28 to the indicator unit 29 remotely located in the cab of the vehicle and providing a visual display of monitored conditions by indicator lamps 30, 31 of various colors. Additional wires 32 are indicated as connected to the indicator unit 29, these wires emanating from similar sensor coil and detector units on the various wheels of the vehicle.

The sensor coil unit 22 is shown in greater detail in FIG. 2 as comprising a pair of coils 34, 35 embedded in a block 36 of plastic, the latter retained in place on the rim of the wheel 15 by a clip 37 insertable between the rim and the bead of the tire 16. The coils 34, 35 are aligned substantially parallel with the axle 10 of the vehicle and are positioned adjacent one another. The coils 34, 35 comprise approximately 20 turns of copper wire wound in opposite directions, interconnected at one end by wire 38, and culminating at the other end in leads 39 which are adapted for connection to the pressure switch 20 as indicated by wire 24 in FIG. 1. While oppositely wound coils 34, 35 are shown in this embodiment of the invention, it will be apparent that a similar effect can be obtained from identical coils, interconnected in inverse relationship, the series circuit of the coils of either configuration being completed by closure of the pressure switch 20. Similarly although multiturn coils 34, 35 are described, it will be apparent that other coil configurations will produce a similar result, and in fact a single loop of wire may be utilized, which loop is formed in the shape of a figure eight. Any of these arrangements provide magnetic field inverstion whereby when current is induced in coil 34, for example, such current will flow through coil 35 in an opposite sense to create a magnetic field in opposition to the received magnetic field.

Shown in FIG. 3 in schematic form are the components comprising a single wheel warning system with the interconnections for additional wheels being depicted in dashed lines. The components forming the detector unit 26 are shown within the dashed box 40 and those of the indicator unit 29 are shown within dashed box 41. In the detector unit 40 are a pair of coils 42, 44 mounted in a configuration similar to the sensor coils 34, 35 shown in FIG. 2 and forming a part of an oscillator circuit 45 comprising transistors 46, 47. Suitable biasing resistors are employed and a positive potential applied on line 48 with respect to ground line 49, with magnetic feedback being realized between coils 42, 44, creates a normal oscillatory mode of operation for the circuit. Transistor 46 is employed for current or voltage gain purposes, receiving the feedback signal from coil 42 at the base electrode thereof and having the collector electrode directly coupled to the base electrode of oscillator transistor 47. The collector of transistor 47 in turn energizes coil 44, the latter being included in a tank circuit having capacitor 50 in shunt connection thereacross, the oscillator 45 being operative to produce a relatively high frequency signal in the normal operating mode.

In the presence of the sensor coil unit 22, however, as indicated by the figure eight loop 51, a current is induced in the right hand portion of the loop 51 from oscillator coil 44 and is coupled to the left hand portion by way of the pressure switch 52 to create a magnetic field of opposite sense linking coil 42. It is significant to note that the magnetic field induced by the sensor coils 22 is abnormal to the environment and is considerably different from that caused by the presence of a magnetically permeable object proxal to the oscillator coils 42, 44, such type of object having the characteristic of increasing the magnetic coupling therebetween. Similarly, a simple coil whether of the single or multiple turn type in proximity to the oscillator coils 42, 44 produces a different effect, primarily that of a shorted turn transformer, whereby energy is absorbed from the magnetic field linking the oscillator coils 42, 44, but not significantly affecting the phase relationships therebetween.

It will be clear that the sensor coils 22 are brought into proximity with the oscillator coils 42, 44 upon each rotation of the wheel 15 during normal movement of the vehicle, the periodicity of same depending upon the velocity of movement of the vehicle. When the sensor coils 22 are proximate the oscillator coils 42, 44, the effect upon the feedback energy is so great as to completely quench the oscillator 45 and to prevent any high frequency output therefrom. Upon removal of the sensor coils 22, the oscillator 45 will revert to the normal operating mode. If the pressure switch 52 is in an open condition, there will be no substantial effect upon the oscillator 45 output. Thus the effect of rotation of the wheel 15 is to modulate the output of the oscillator 45 at a corresponding frequency, only when the pressure switch 52 is closed, indicating a normal tire pressure.

The output of the oscillator 45 is applied to the demodulation portion of the detector unit 40 being coupled from the collector of transistor 47 to the base electrode of transistor 54 by capacitor 55 to control the conduction of current to the RC charging circuit 56 in the emitter path of transistor 54. The charging time of the RC circuit 56 is long with respect to the high frequency output of the oscillator 45 but short with respect to the modulation signal thereon so as to provide a pulse at the emitter of transistor 54 each time the sensor coil unit 22 passes the oscillator coils 42, 44.

A comparator circuit is utilized for sensing the presence of such modulated pulses, such circuit comprising transistor 58 having its emitter connected to the capacitor 59 in the charging circuit 56 and its base connected to a second capacitor 60, with a diode 61 connected between the capacitors 59, 60. The DC voltage developed in the charging circuit 56 is applied by way of the diode 61 to the second capacitor 60 to develop a reference level thereacross and such diode 61 is maintained forward biased so long as the developed voltage remains at a high level. When a negative pulse, however, occurs in the charging circuit 56 due to quenching of the oscillator 45, the diode 61 is reversely biased and the charge on the second capacitor 60 creates a forward bias for transistor 58 developing a pulse across its collector resistor 62. In the absence of modulation of the oscillator 45 or alternatively in the absence of the oscillator signal itself due to circuit failure or the continued presence of sensor loop 51 adjacent the oscillator coils 42, 44, no pulse voltage will be developed at the collector of transistor 58, an equality of the voltages across the capacitors 59, 60 being realized at these times.

The collector of transistor 58 is directly coupled to the base electrode of transistor 64, the latter having a capacitor 65 in the collector path thereof for developing a voltage level for control of the indicator unit 41. The capacitor 65 and associated discharge path provide a relatively long time constant so as to accumulate the pulses developed from the passage of the sensor coil unit 22 even at relatively low rates of vehicle motion, but sufficiently short so as to become discharged within the time for a few rotations of the wheel 15, when no modulating conditions are present. The voltage thus developed across the capacitor 65 is applied to the base electrode of transistor 66, acting as a buffer amplifier, and providing a corresponding signal output on line 68 at the emitter electrode.

The signal on line 68 is the control signal from a single wheel detector unit 26 and is routed to the cab of the vehicle and to a logic circuit 69, another wheel detector unit signal being indicated at terminal 70 for simultaneous control of the common indicator unit 41. In the indicator unit 41, a pair of indicator devices are employed for visual interpretation of the operation of the system, the indicator devices comprising a green lamp 71 and a red lamp 72 connected respectively in the collector paths of transistors 74, 75 which are directly coupled by way of resistor 76. Transistor 74 is in turn coupled by resistor 78 to the emitter electrode of transistor 79 which receives an input voltage from the logic circuit 69, sensitive to the conditions on all monitored wheels of the vehicle. The interconnection of transistors 74, 75 provides alternate indications from the green lamp 71 and red lamp 72 or alternatively, no indication in the event of power supply failure and the like.

The logic circuit 69 comprises semi-conductor diodes 80, 80a connected to the lines 68, 70 emanating from the wheel detector units, having anodes connected in common to line 81 for developing a voltage across base bias resistor 82. Emitter resistors 84, 84a are included in the logic circuit 69, being connected from the cathodes of the diodes 80, 80a to ground 49. The action of the diodes 80, 80a in common is that of a logic AND gate requiring the presence of a positive potential at the cathode of each diode 80, 80a to maintain the voltage on line 81 at a high level, bias being supplied by resistor 82. If any one or more of the diodes 80, 80a become forward biased when the signal from the wheel detector units on line 68 or 70 drops to a low level, the level on line 81 will be lowered to a level to bias off transistor 79. Since transistor 79 normally provides bias current for transistor 74, the latter will be biased off resulting in extinguishment of the green lamp 71 and raising the voltage applied to the base of transistor 75 thereby causing energization of the red lamp 72, providing an indication of fault in the system. Normal operation of the circuit finds transistor 79 forward biased along with transistor 74, the latter drawing collector current through the green lamp 71 and providing an indication from same, the voltage drop across the green lamp 71 providing insufficient forward bias to transistor 75 causing extinguishment of the red lamp 72.

Referring now to FIG. 4 there is shown a variation of the indicator unit particularly suited for bus, truck and other multiple wheeled vehicle use. In an arrangement of this type, it is desired to have sufficient indicating devices in order to provide an adequate indication of all wheel characteristics without the system being so complex and costly as to be prohibitive for extensive use.

In this embodiment of the invention, a green lamp 85 is again provided to supply an indication of operativeness of the system in a normal running mode whereby suitable signals are received from each of the wheel detector units in the system. A pair of red lamps 86, 88 are utilized also, providing an individual indication for the left and right front wheels of the vehicle respectively, and providing an indication in common of fault in the remainder of the implemented wheels of the vehicle.

In a manner similar to the indicator unit 41 previously described, the red lamps 86, 88 are connected in the collector paths of transistors 89, 90, which transistors are directly coupled to preceding transistors 91, 92 receiving input signals on lines 94, 95 from the front left and right wheel detectors, respectively.

Thus in the presence of a positive signal on line 94 forward biasing transistor 91 and causing conduction thereof to lower the collector electrode potential, transistor 89 will be biased to an "off" condition preventing illumination of the red lamp 86 and causing the collector electrode to rise in voltage. It is noted that resistors 96, 97 connect the collectors of transistors 89, 90 with the bases of transistors 91, 92, adding positive feedback to the circuit to assure saturated operation in either the conductive or cut-off conditions. The collectors of transistors 89, 90 are connected by way of resistors 98, 99, respectively, to the base electrode of transistor 100 controlling energization of the green lamp 85. The biasing arrangement of transistor 100 is such that it is required that both red lamps 86, 88 be non-energized in order to forward bias transistor 100 and illuminate the green lamp 85. The emitter of transistor 100 is connected to the junction of a pair of series diodes 101, 102 in the emitter paths of the red lamp transistors 89, 90, such arrangement utilizing the forward voltage drop of the diodes 101, 102 for biasing purposes.

Detector units as previously described are provided for each wheel of the vehicle which is to be monitored and in this embodiment of the invention four input leads 104–107 for four wheel detector units are shown. The leads are connected to various contacts of a multi-position selector switch 108, one connection 109 being indicated as optional. The leads 104–107 are connected by way of diodes 110 to a common bus 111, in turn connected to one contact 112 of the selector switch 108. The switch arm 114 in turn is connected through a resistor 115 to the positive potential bus and also by way of a pair of diodes 116, 118 to the input lines 94, 95, respectively.

The diodes 110 again provide an AND gate function for controlling the level of the common bus 111. The pair of diodes 116, 118 provide primarily an isolation function and a low signal level at the arm 114 of the selector switch 108 will draw both input lines 94, 95 to a correspondingly low level and provide a simultaneous illumination of the red lamps 86, 88.

Thus, in operation under normal conditions positive level signals are applied on each of the input leads 104–107 from the individual detector units and back bias the diodes 110 to render bus 111 and the selector switch arm 114 at a high potential. The position of the selector switch 108 shown in FIG. 4 is the normal running position and provides an indication of fault in any one of the wheel detector units, which fault can then be located by movement of the switch arm 114 through the various contacts. The connection of the last position of the switch to input lead 107, indicated by the dashed line 109, provides positive but redundant information and may be omitted. When any one or more of the input leads 104–107 drops to a low level, the common bus 111 will also, drawing down both input leads 94, 95 through diodes 116, 118, thereby causing illumination of both red lamps 86, 88 and due to the low voltage upon the base electrode of transistor 100 and the reverse bias provided by the diode 102, preventing energization of the green lamp 85.

Figure 5:
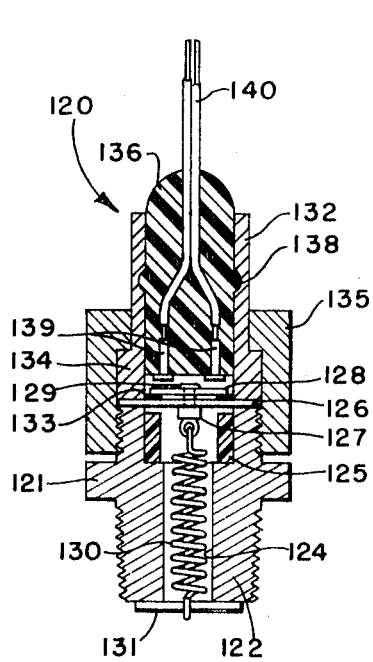
FIG. 5 is a cross-sectional view of a tire pressure switch particularly applicable to trucks.

Referring now to FIG. 5, there is shown one embodiment of a tire pressure switch 120 particularly suitable for truck applications, providing closure for an electrical circuit in response to normal or higher than normal pressure conditions within the tire, and presenting an open circuit condition when pressure levels are lower than the normal level. The pressure switch 120 is referenced to the showing of FIG. 1 being suited for monitoring the pressure in tire 16 and for effecting switching of the sensor coil unit 22, connection being made by wires 24.

The pressure switch 120 comprises a body member 121 of generally cylindrical configuration having a threaded lower portion 122 which is adapted for receipt in the "T" member 19, including a bore 124 therethrough which is in communication with the air under pressure in the tire 16. The upper end of the bore 124 is enlarged and received therein is a plastic stop washer 125 of annular configuration. The upper end of the bore 124 is sealed by a circular rubber diaphragm 126 which is adapted for upward or downward flexing in response to the air pressure on the lower face thereof. A circular contact plast 128 is supported on the rubber diaphragm 126 for movement therewith and is secured in place by a rivet 129 passing therethrough, sealing being established at the shoulder 127 of the rivet 129. A plastic film washer 133 is disposed between the contact plate 128 and the diaphragm 126 to allow a slight amount of relative movement of the contact plate 128. A tension spring 130 is secured to an eyelet in the rivet 129 at one end and at the other by a pin 131 passed through the last coil of the spring and abutting the lower face of the body member 121.

The rubber diaphragm 126 is clamped in place by a shell 132 having a lower shoulder 134 thereon, which receives a nut 135 threadedly engaging the upper portion of the body member 121. The shell 132 is partially filled with potting compound 136, filling an annular groove 138 therein, and supporting a pair contact pins 139 having faces exposed to the contact plate 128. A pair of insulated lead wires 140 are also supported in the potting compound 136 and are in electrical connection with the contact pins 139 adapted for remote connection to the sensor coil unit 22.

Thus in normal operation with air under pressure in the bore 124 of the body member 121, sufficient force will be developed on the lower face of the rubber diaphragm 126 to urge same upwardly against the bias of spring 130, so that the contact plate 128 engages the contact pins 139 for closure of the electrical circuit, the slight movement of the contact plate 128 on the washer 133, enhancing the electrical contact. Upon lowering of the air pressure in the bore 124, the rubber diaphragm will return to the position indicated in FIG. 5 or to a yet lower position, under urging of the rubber diaphragm 126 itself and the bias exerted by the tension spring 130, the stop washer 125 limiting movement of the rubber diaphragm 126 so as not to subject it to excessive stretching and premature failure. Adjustment of the operating point of the pressure switch 120 is made primarily by selection of the characteristics of the spring 130 although further adjustment can be provided by modifying the tension in the spring 130 by varying the extension of same.

Figure 6:
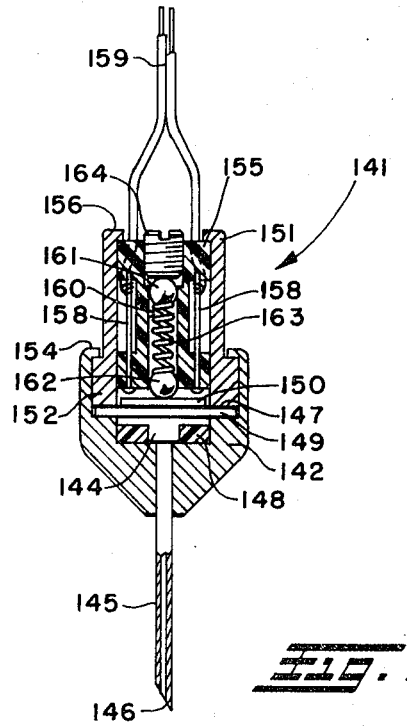
FIG. 6 is a cross-sectional view of a tire pressure switch particularly applicable to passenger cars.

Another embodiment of pressure switch 141 is depicted in FIG. 6, this being particularly suitable for passenger car use where appearance and mass fabrication as well as reliability are of prime importance. This switch 141 is adapted for direct communication with the air under pressure within a tire, not requiring the "T" adaptor 19 shown in conjunction with the truck type switch. This pressure switch 141 comprises a generally conically shaped body member 142, having a bore 144 therein and sealingly receiving at the apex, a long thin tube 145. The tube 145 is tapered at the end 146 to form a point which is adapted for insertion through the rubber base of a conventional tire valve stem, resembling in shape, but somewhat larger than a conventional hypodermic needle. The interior of the tube 145 communicates with the bore 144 in the body member 142 so that the bore is exposed to the air pressure of the tire. Located within the bore 144 is a plastic limit washer 148 performing a similar function to that previously described.

The bore 144 of the body member 142 is closed with a circular rubber diaphragm 149 having a circular contact plate 150 supported thereon and adapted for upward and downward movement as a function of the air pressure within the tire to which the lower face of the diaphragm 149 is exposed. An amount of silicone or castor oil forms a film 147 between the contact plate 150 and the diaphragm 149 acting as a lubricant to allow the contact plate 150 to float thereon. The diaphragm 149 is retained in place by a shell 151, a shoulder 152 on the latter being secured by the turned in flange 154 of the body member 142. The shell 151 receives therein a plastic spool 155, in turn secured by the turned in flange 156 at the upper end thereof. The lower portion of the spool 155 retains the contact pins 158, the heads of which are adapted for engagement by the contact plate 150 for completion of the electrical circuit, electrical connection being made to the conductive shanks of the contact pins 158 by suitable lead wires 159, the latter passing through apertures in and being supported in position by the upper portion of the plastic spool 155.

The spool 155 includes a central bore 160 therein which receives a pair of ball bearings 161, 162 and a compression spring 163 therebetween, being threaded at the upper portion for receipt of an adjustment screw 164. The lower ball bearing 162 is in engagement with the contact plate 150 and the bias of the spring 163 thereagainst resists the distention of the rubber diaphragm 149 and sets the pressure level at which the contact plate 150 engages or disengages the contact pins 158. Adjustment of the switching level of the pressure switch 141 may be made by threading the adjustment screw 164 in the bore 160 of the spool 155 thereby to alter the compression of the spring 163 and the resistance to movement of the rubber diaphragm 149.

As the only contact with the tire of the vehicle is through the tube 145 extending from the body member 142, securement of the latter to the wheel of the vehicle may be made by means of a strap or the like encircling the body member 142 or the shell 151 for rigidly clamping the pressure switch 141 in position. The silicone or oil forming the film 147 may also permeate the bore 160 of the spool 155 and is advantageous in maintaining the heads of the contact pins 158 clean. Although the oil is non-conductive it prevents corrosion of the electrical contacts and has no deleterious effect on the diaphragm 149.

While certain representative embodiments and details have been shown for the purpose of illustrating the invention, it will be apparent to those skilled in the art that various changes and modifications may be made therein without departing from the spirit or scope of the invention.

The embodiments of the invention in which an exclusive property or privilege is claimed are defined as follows:

1. A tire pressure indicating system for vehicles, comprising a pair of magnetically coupled coils on the relatively stationary portion of the vehicle, means responsive to the magnetic coupling of said pair of coils for developing an oscillatory signal, means on a wheel of the vehicle for reversing the magnetic coupling in said pair of coils to affect the oscillatory signal when the pressure in the tire is at a predetermined level, and circuit means operatively connected with said signal developing means for providing indications representative of the state of the oscillatory signal.

2. The system as set forth in claim 1 wherein said magnetic coupling reversing means comprises a pressure switch mounted for movement with the wheel of the vehicle for monitoring air pressure in the tire, and a movable pair of coils interconnected by said pressure switch, said movable pair of coils movable with the wheel in a path of travel adjacent said magnetically coupled coils on the relatively stationary portion for periodically reversing the magnetic coupling of the latter.

3. The system as set forth in claim 2 wherein said movable pair of coils comprises a loop of conductive wire folded in a figure eight for reversal of a received magnetic field, said pressure switch being connected in said loop to provide electrical continuity at the predetermined tire pressure level.

4. The system as set forth in claim 2 wherein said movable pair of coils comprises first and second multiple turn coils having substantially parallel coil axes, mounted on the rim of the wheel adjacent one another and aligned substantially parallel with the wheel axle, said pressure switch being in series connection with said multiple turn coils.

5. The system as set forth in claim 1 wherein said magnetic coupling reversing means on the wheel of the vehicle periodically affect the magnetic coupling in said magnetically coupled pair of coils due to wheel rotation when the vehicle is in motion, said circuit means comprising means for developing a pulse each time the magnetic coupling is so affected, means for accumulating the pulses from said pulse developing means, and a signal circuit responsive to said accumulating means for providing visual indications of the presence and absence of accumulated pulses.

6. The system as set forth in claim 5 wherein said accumulating means comprises a charging circuit having a time constant sufficiently long to develop a predetermined DC level from the periodically occurring pulses caused by wheel rotation, said signal circuit comprising an amplifier and a signal lamp, said amplifier being responsive to such DC level to cause illumination of said signal lamp.

7. The system as set forth in claim 5 wherein said pulse developing means comprises a detector circuit for providing a signal representative of the oscillatory signal, a reference source of voltage, and a comparator operatively coupled to said detector circuit and said reference source for providing a pulse output when the magnetic coupling is reversed.

8. The system as set forth in claim 7 wherein said reference source of voltage comprises a charging circuit coupled to said detector circuit for developing a reference voltage therefrom.

9. A system for signalling conditions between movable and relatively stationary members, comprising a switch on the movable member responsive to the conditions, magnetic field reversing modulating means in connection with said switch for establishing a magnetic field when said switch is in a closed state, an oscillator on the relatively stationary member, said oscillator being magnetically coupled with said modulating means and affected by the magnetic field thereof to provide a modulated output, demodulator means responsive to said oscillator output for developing the modulation signal, means for converting the modulation signal to a control signal, and means responsive to said control signal for providing visual indications representative of the presence and absence of the modulation signal.

10. Apparatus for signalling low tire pressure conditions on a vehicle, comprising a pressure switch and coil combination in each monitored wheel of the vehicle, an oscillator and circuit means associated with each said switch and coil combination, said oscillators being periodically quenched under normal tire pressure conditions due to wheel rotation, said circuit means being operative to form control signals indicative of such periodic quenching, a circuit for illuminating indicator lamps, and means for combining the control signals from said circuit means for energizing said illuminating circuit to provide signals of normal pressure conditions on all wheels and low pressure conditions on any single wheel.

11. Apparatus as set forth in claim 10 wherein said combining means comprises a diode logic circuit receiving as inputs the control signals from said circuit means and providing an output signal to said illuminating circuit.

12. Apparatus as set forth in claim 11 wherein said illuminating circuit comprise a pair of transistor amplifiers for energizing a pair of said indicator lamps, said amplifiers being interconnected to alternately energize said lamps.

13. Apparatus as set forth in claim 10 wherein said combining means comprises a diode logic circuit for receiving control signal inputs from a plurality of wheels of the vehicle, and a selector switch receiving as inputs such control signals and the output signal from said logic circuit, said switch providing individual and common control of said illuminating circuit.

14. Apparatus for signalling tire pressure conditions of a vehicle wheel, comprising an oscillator on the relatively stationary portion of the vehicle, said oscillator having a primary coil and a feedback coil in normal magnetically coupled relationship for producing oscillation, a pressure switch, a pair of coils interconnected with said pressure switch and mounted on the wheel of the vehicle for movement to a position of magnetic coupling with said oscillator primary and feedback coils, said pair of coils reversing the direction of induced magnetic coupling and providing magnetic feedback from said primary coil to said feedback coil differing from the normal phase relationship and in a phase relationship tending to prevent oscillation, and means for providing signals indicative of the state of oscillation of said oscillator.

15. The apparatus of claim 14, wherein the pressure switch includes a pair of electrical contacts, a flexible diaphragm disposed in spaced relation from the contacts and movable in response to changes in air pressure within the tire, a contact plate movable in unison with the diaphragm for placing the contacts in electrical communication, means for biasing the contact plate in a direction away from the contacts, and a lubricant interposed between the diaphragm and contact plate for maintaining the contact plate in free floating relation on the diaphragm.

16. The apparatus of claim 15, wherein the lubricant comprises oil which is electrically non-conductive and has no deleterious effect on the diaphragm.

17. The apparatus of claim 16, wherein the lubricant is silicone oil.

* * * * *